United States Patent [19]
Dickson et al.

[11] Patent Number: 5,900,199
[45] Date of Patent: May 4, 1999

[54] PROCESS FOR MAKING A VEHICLE GRILLE GUARD

[75] Inventors: Floyd R. Dickson, Huntsville, Canada; Lino C. Mallia, Harrison Township, Mich.

[73] Assignee: Algonquin Automotive, Huntsville, Canada

[21] Appl. No.: 08/976,416

[22] Filed: Nov. 21, 1997

[51] Int. Cl.⁶ .......................... B29C 45/00; B29D 22/00
[52] U.S. Cl. ................................. 264/85; 264/572
[58] Field of Search .................... 264/85, 328.8, 264/328.12, 328.13, 572

[56] References Cited

U.S. PATENT DOCUMENTS

| | | |
|---|---|---|
| D. 257,430 | 10/1980 | Hickey . |
| D. 259,873 | 7/1981 | Milner . |
| D. 275,475 | 9/1984 | Turkleson . |
| D. 300,420 | 3/1989 | Trinnaman . |
| D. 361,316 | 8/1995 | Orth, Sr. et al. . |
| D. 384,625 | 10/1997 | Thorne et al. . |
| 3,622,174 | 11/1971 | Wakeen et al. . |
| 4,099,760 | 7/1978 | Mascotte et al. . |
| 4,120,923 | 10/1978 | Kloker et al. . |
| 4,168,855 | 9/1979 | Koch . |
| 4,211,523 | 7/1980 | Hunerberg . |
| 4,436,679 | 3/1984 | Winstead . |
| 4,671,552 | 6/1987 | Anderson et al. . |
| 4,675,141 | 6/1987 | Kumazaki . |
| 4,750,409 | 6/1988 | Hendry . |
| 5,098,637 | 3/1992 | Hendry . |
| 5,204,050 | 4/1993 | Loren . |
| 5,215,343 | 6/1993 | Fortune . |
| 5,277,465 | 1/1994 | Weir . |
| 5,401,459 | 3/1995 | Nichols et al. . |
| 5,411,685 | 5/1995 | Burgis . |
| 5,482,669 | 1/1996 | Shah . |
| 5,662,841 | 9/1997 | Guergov . |

FOREIGN PATENT DOCUMENTS 7-76252  3/1995  Japan .

*Primary Examiner*—Leo B. Tentoni
*Attorney, Agent, or Firm*—Harness, Dickey & Pierce, PLC

[57] ABSTRACT

The present invention provides a new and improved process of producing vehicle grille guards by gas-assisted injection molding and the grille guards produced thereby. The process includes injecting a plastic resin into a mold cavity in an amount less than the total volume of the mold cavity. An inert gas in then injected into a center portion of the cavity and a hollow gas channel extending throughout the center portion is formed, forcing the plastic resin to flow along an outer surface of the cavity.

6 Claims, 2 Drawing Sheets

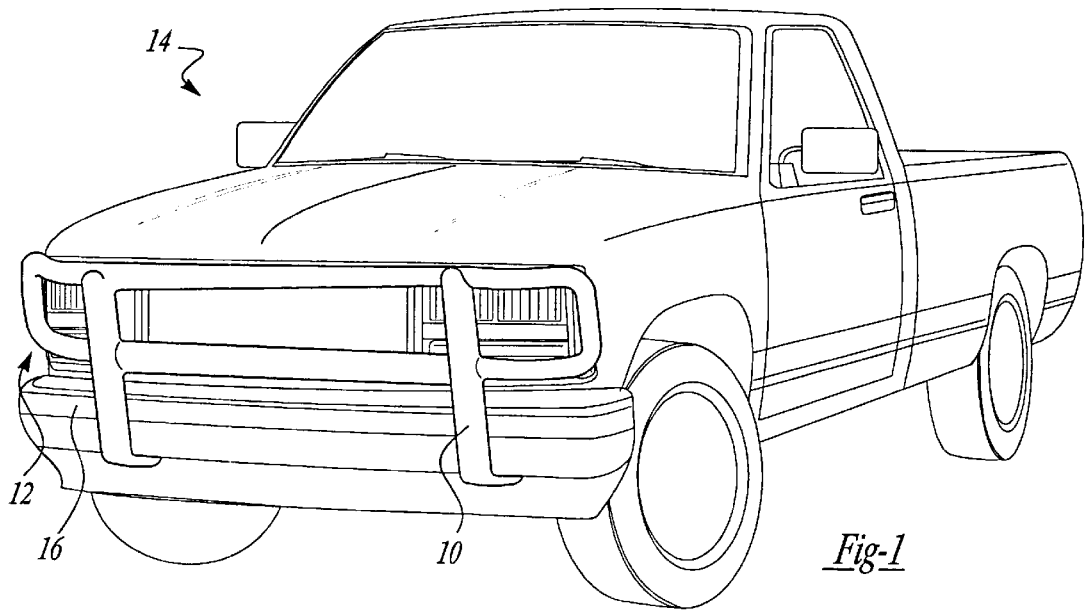
Fig-1
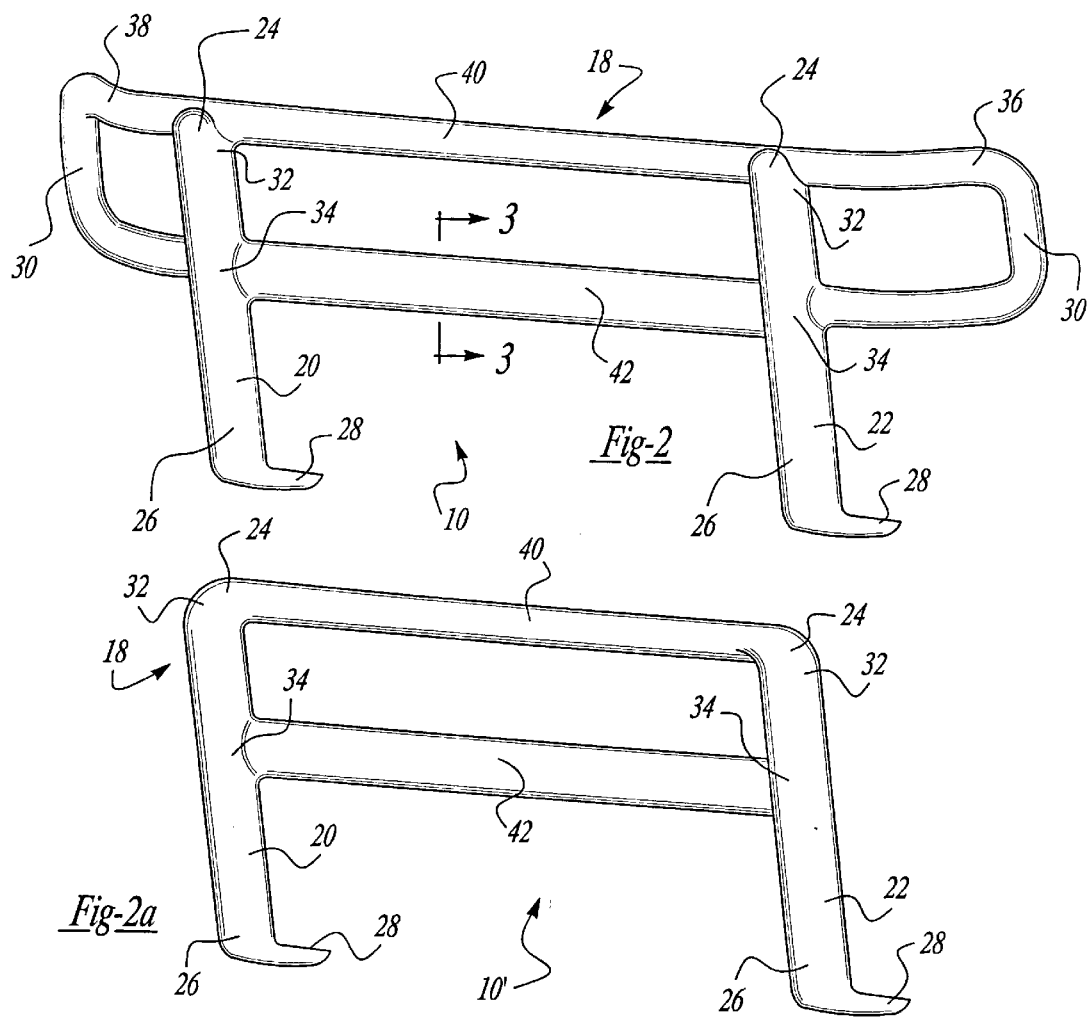
Fig-2
Fig-2a

PROCESS FOR MAKING A VEHICLE GRILLE GUARD

BACKGROUND OF THE INVENTION

1. Field of the Invention

The present invention relates generally to vehicle grille guards, and more particularly to a structural web automotive grille guard and a process for preparing the same.

2. Discussion

Current grille guards are typically made of a welded steel construction and are usually chrome plated to provide an attractive finish surface. However, such prior art steel grille guards are relatively heavy, which is highly undesirable. For example, heavy grille guards may cause the balance of the vehicle to be adversely affected which in turn can render steering more difficult.

Further, such prior art steel grille guards tend to be relatively expensive as to material cost, in view of the steel and chrome coating materials. Additionally, the manufacturing and labor costs tend to be high, due for example, from the need for welding the grille to the vehicle frame or chassis. Yet another possible problem with chrome coated grille guards is the likelihood that the chrome will wear away over time leaving the steel exposed and subject to unsightly rust.

In an apparent effort to address one or more of the perceived problems with steel grille guards, other prior art grille guards have been proposed which are formed from semi-rigid, self-skinning, foamed polyurethane with reinforcing metal strips, as in U.S. Pat. No. 5,215,343 or polycarbonate tubes as disclosed in U.S. Pat. No. 4,168,855. However, the use of self-skinning foaming material or certain thermoplastic resins presents problems with regard to strength and durability as compared to steel guards.

Thus, there exists a need in the art to produce a vehicle grille guard that is lightweight, cost effective, and of high strength. The present invention provides a structural web injected plastic grille guard that can be produced cost effectively, is lightweight and non-corrosive but maintains an effective combination of rigidity and flexibility.

SUMMARY OF THE INVENTION

The present invention provides a new and improved process of producing vehicle grille guards by gas-assisted injection molding and the grille guards produced thereby. The process of producing the vehicle grille guard of the present invention includes injecting a plastic resin into a mold cavity in an amount less than the total volume of the mold cavity. An inert gas is then injected into a center portion of the cavity and a hollow gas channel extending throughout the center portion is formed, forcing the plastic resin to flow along an outer surface of the cavity. The vehicle grille guard obtains a substantially smooth exterior surface as the resin flows along the outer surface of the cavity.

BRIEF DESCRIPTION OF THE DRAWINGS

Additional objects and advantages of the present invention will become apparent from a reading of the following detailed description of the preferred embodiment which makes reference to the drawings of which:

FIG. 1 is a perspective view of a first embodiment of a vehicle grille guard mounted on a front end of a vehicle;

FIG. 2 is a perspective view of the vehicle grille guard shown in FIG. 1;

FIG. 2a is a perspective view of another embodiment of a vehicle grille guard.

DETAILED DESCRIPTION OF THE PREFERRED EMBODIMENT

Figure 3:
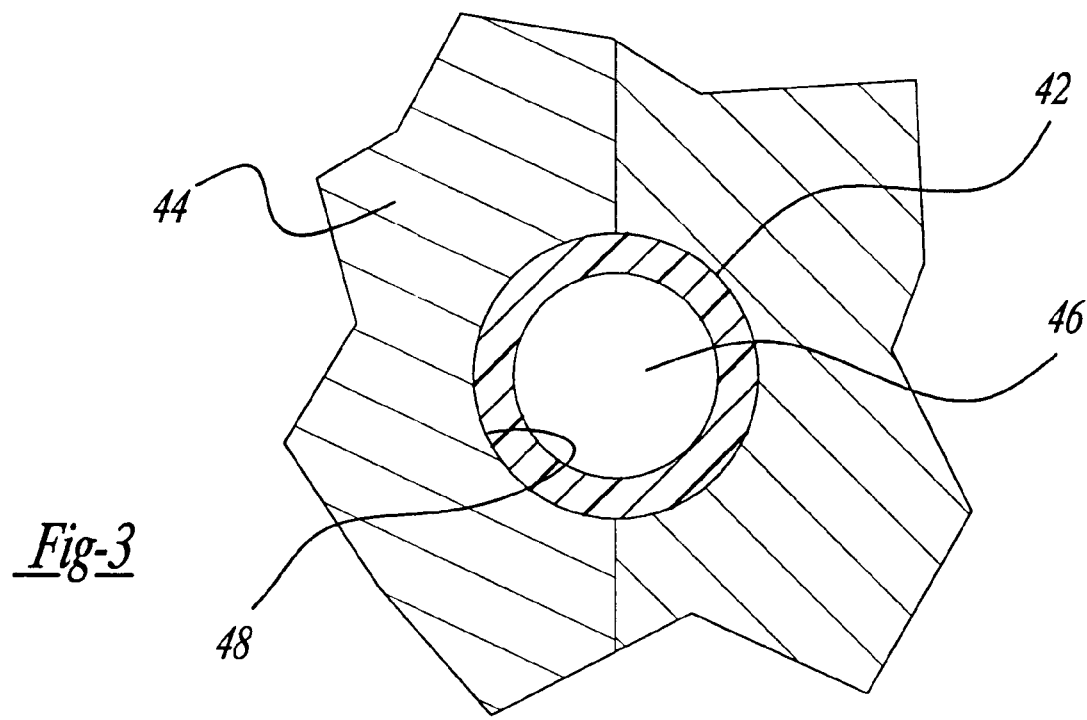
FIG. 3 is a cross-sectional view taken along the 3—3 line of the embodiment of FIG. 2 enclosed in a mold cavity.

Referring to FIGS. 1 and 2, there is shown a vehicle grille guard 10 mounted to a front end 12 of a vehicle 14. Grille guard 10 may be attached under the surface of bumper 16 of front end 12, or alternatively, attached to the chassis of the vehicle using conventional mounting components. In one embodiment, referring to FIGS. 1 and 2, the grille guard 10 generally includes a body 18 including a pair of spaced vertically disposed bars 20 and 22, each having a first end 24 and a second end 26, wherein the second end includes a substantially flat portion 28. Grille guard 10 includes an elongated loop 30 connected to and extending transversely from bars 20 and 22 at two different points, 32 and 34, respectively. Elongated loop 30 further includes first portion 36 and second portion 38. Grille guard 10 further includes a pair of horizontally extending bars 40 and 42. Elongated loop 30, horizontally extending bars 40 and 42, and vertically extending bars 20 and 22 may preferably be formed as an unitary structure as will be described in greater detail below. Optionally, first and second portions 36 and 38, respectively, of the elongated loop may be formed so as to curve slightly inward toward front end 12 of the vehicle.

Referring now to FIG. 2a, a grille guard in accordance with another embodiment of the invention is identified generally as reference numeral 10'. Grille guard 10' is the same as grille guard 10 described above but grille guard 10' does not include elongated loop 30.

To produce the vehicle grille guard of the present invention, an extruded plastic resin is injected into a mold cavity having the geometry of the desired grille guard end product.

The plastic resin employed may, for example, be selected from acrylonitrile-butadiene-styrene (ABS) resins, acrylonitrile-butadiene-styrene/polycarbonate blends, polyesters, polyvinyls, polycarbonate/polyester blends, such as XENOY®, manufactured by GE Plastics, and mixtures thereof, among others. Regardless of the plastic employed, it is preferred that the resin is thermoplastic, has a high impact resistance and a flexural modulus of at least about 270,000 psi, and may be employed at a low temperature.

The use of plastic resin material as opposed to steel found in conventional grille guards results in a non-corrosive plastic grille guard that is approximately one-half the weight of steel guards. The low weight of a structural plastic grille guard also reduces the effect on air bags and other passive restraint systems in a vehicle. Moreover, plastic, as opposed to metal, has the ability to absorb energy without permanent deformation.

The present process is conducted by structural web or plastic web molding, a gas-assisted injection molding process that allows for the production of unitary or one piece grille guards at a lower cost than prior art multi-component grille guards. In addition, plastic web molding requires low pressure, subsequently allowing for reduced tooling budgets. Injection molding techniques allow for the production of more complex parts having closed cross sections, as compared to other molding procedures such as compression molding. In addition, many standard finishing techniques may be utilized, including, but not limited to, molded-in color, body color paint, and chrome. Gas-assisted injection molding methods are well known in the art, as set forth in, for example, U.S. Pat. Nos. 5,098,637 and 5,204,050, incorporated herein by reference, and need not be discussed in great detail here.

Structural web molding provides the vehicle grille guard of the present invention with increased strength and rigidity necessary for large structural parts. Additionally, the use of the structural web design provides an improved combination of rigidity and flexibility for the vehicle grille guard, allowing the design to be modified in order to meet different customer and vehicle requirements by adjusting the selection and design of attachments for mounting the grille guard, selection of material, cross-sections of the material, and process parameters.

The process of producing the vehicle grille guard of the present invention by gas-assist injection molding includes injecting a plastic resin into a mold cavity in an amount less than the total volume of the mold cavity. An inert gas is then injected into a center portion of the cavity and a hollow gas channel extending throughout the center portion is formed, forcing the plastic resin to flow along an outer surface of the cavity. A cross-sectional view of hollow bar 42 of grille guard 10 of a preferred embodiment grille guard enclosed within a mold cavity 44 is as shown in FIG. 3. The geometry of mold cavity 44 includes a hollow center portion 46 and an outer surface 48. The inert gas may be injected into the mold cavity at the same location as the plastic is injected; or alternatively, at a separate location. The inert gas employed is selected from the group consisting of air, helium, neon, argon, carbon dioxide, nitrogen, and mixtures thereof.

Additionally, the vehicle grille guard obtains a substantially smooth exterior surface as a result of the resin flowing along the outer surface of the cavity. The smooth exterior surface produced is preferably a Class A surface, known in the automotive industry as a finished surface with very few defects and utilized on high visibility structural parts, such as grille guards and doors.

As set forth herein, the grille guard of the present invention may be formed as an unitary structure as shown in FIGS. 2 and 2a. In another exemplary embodiment of the present invention, the grille guard may be formed as a multiple component structure. For example, first and second portions 36 and 38, respectively, (see FIG. 2), which function as brush guards and essentially wrap around and protect the vehicle's headlights, may be formed as separate components and added to the body of the grille guard. The grille guard in accordance with the teachings of the present invention, however, is not limited to the shapes as shown in the figures and may be molded into various geometries using the structural web process.

While the above description constitutes the preferred embodiment of the invention, it will be appreciated that the invention is susceptible to modification, variation, and change without departing from the proper scope or fair meaning of the accompanying claims.

What is claimed is:

1. A process of producing a vehicle grille guard formed as one component, the process comprising the steps of:

injecting a plastic resin into a mold cavity in an amount less than the total volume of said mold cavity;

injecting an inert gas into a center portion of said cavity; and forming a hollow gas channel extending throughout said center portion, forcing said plastic resin to flow along an outer surface of said cavity;

wherein said grille guard obtains a substantially smooth exterior surface as said resin flows along said outer surface of said cavity.

2. The process according to claim 1, wherein said plastic resin is a thermoplastic resin.

3. The process according to claim 1, wherein said plastic resin is selected from the group consisting of acrylonitrile-butadiene-styrenes, acrylonitrile-butadiene-styrene/polycarbonate blends, polyesters, polyvinyls, polycarbonate/polyester blends, and mixtures thereof.

4. The process according to claim 1, wherein said inert gas is selected from the group consisting of air, helium, neon, argon, carbon dioxide, nitrogen, and mixtures thereof.

5. The process according to claim 1, wherein said smooth exterior surface is a Class A surface.

6. The process according to claim 1, wherein said vehicle grille guard further comprises brush guard components.

\* \* \* \* \*